March 13, 1934.   P. J. FITZGERALD   1,950,724
OIL EXCLUDING RING
Filed Oct. 3, 1933
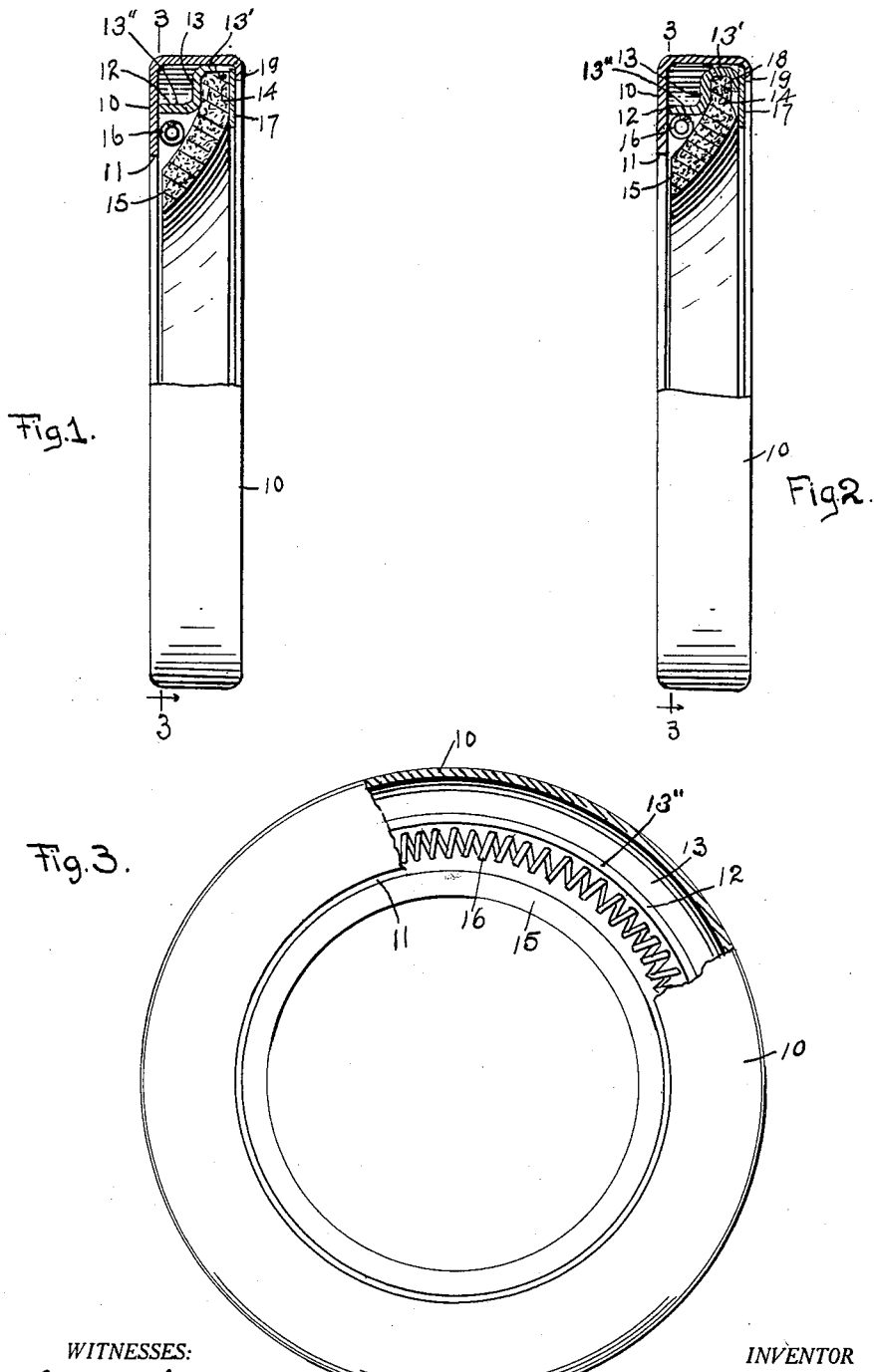

Patented Mar. 13, 1934

1,950,724

UNITED STATES PATENT OFFICE 1,950,724

OIL EXCLUDING RING

Patrick J. Fitzgerald, Torrington, Conn., assignor to The Fitzgerald Manufacturing Company, Torrington, Conn., a corporation of Connecticut Application October 3, 1933, Serial No. 691,907

4 Claims. (Cl. 288—1)

This invention relates to oil excluding rings, and has for an object to provide an oil excluding device embodying a flexible packing member, a radially extending relatively flat surface of annular shape, an integral sleeve with a spring for holding the sleeve in engagement with the shaft, and an improved type of cage for holding the packing.

A further object of the invention is to provide in combination with an improved flexible packing of the kind mentioned, a cage embodying an ogee against which the flexible packing engages, and holds the packing in proper relation to the cage as an entirety.

A further object of the invention is to provide a cage having an ogee annulus within the cage of less over-all thickness than the cage, providing space for supporting a flexible packing, and a washer engaging against the packing to hold the packing in engagement with the ogee annulus and in proper centered position relative to the cage as an entirety.

A further object of the invention is to provide a cage, an annular ogee mounted therein, with its edge turned over the periphery of the packing member, and a washer for holding the ogee and packing within the cage.

The invention, therefore, comprises a cup-shaped annular member, an ogee annular member, one shoulder of which supports the radial extending part of the packing, with the sleeve extending through the opening of the annulus, said ogee being turned over the edge of the packing, or stopping short of the opposite surface of the packing, according to the specific embodiment, with a washer for holding the packing and ogee in the cage, the edge of the cage being turned over the washer, holding all in a unitary structure.

The drawing illustrates several embodiments of the invention and the views therein are as follows:

Figure 1 is a view partly in edge elevation and partly in diametrical section of one embodiment of the invention, Figure 2 is a view partly in edge elevation and partly in diametrical section of a slightly different embodiment, and Figure 3 is a sectional view taken on line 3—3 of either Figures 1 or 2, as indicated by line 3—3 of those figures.

Like characters of reference indicate corresponding parts throughout the several views.

The oil excluding ring comprises a cup-shaped member 10 having an annular opening 11 through which the shaft extends to which the ring is applied.

Within the cup-shaped member an ogee annulus 12 is mounted upon the shoulder part 13 of which rests the radially extending or substantially plane section 14 of the packing. Upon the exterior side of the shoulder part 13 is a flange 13′ and from the inner side of the said shoulder part a flange 13″ extends in a direction opposite to the flange 13′. The packing is then curved to form an annular sleeve 15 which surrounds and bears against the shaft. A helical spring 16 bears against the sleeve and holds it yieldingly in position for oil excluding contact with the shaft.

A washer 17 is employed for holding the ogee and flexible packing in position. In the type shown at Figure 1, this washer 17 bears directly against the packing, whereas in the type shown at Figure 2, the ogee is provided with an inturned bead 18 which clamps the flexible packing member and against which the washer 17 rests.

All the sections are held together by turning in the edge 19 of the cup 10 which may be accomplished by the use of any approved mechanical means.

In operation the device is mounted with the flexible packing in engagement with the shaft, and the cage as an entirety is clamped in any approved mechanical accessory, which accompanies the bearing or the shaft. The spring 16 bearing against the flexible packing holds the sleeve of the packing in engagement with the shaft in oil excluding relation.

Of course, the oil excluding ring herein described may be modified and changed in various ways without departing from the invention herein set forth and hereinafter claimed.

I claim:—

1. An oil excluding ring comprising an annular cup member, an annular ogee member mounted within the cup member, an annular flexible packing having its perimeter mounted within the ogee member, said ogee member being turned over to clamp the packing member, a washer engaging against the turned over edge of the ogee member, the edge of the cup member being turned over to anchor the washer.

2. An oil excluding ring comprising a cage having annular sides and a perimetrical wall, an ogee member mounted within the cage, said ogee member comprising radially spaced flanges with a connecting shoulder member, and a flexible packing member seated upon the shoulder member and clamped thereon by one of the annular sides.

3. An oil excluding ring comprising a cage having an annular side and a perimetrical wall, an ogee annulus mounted within the cage, said annulus comprising oppositely directed radially spaced flanges interconnected by a shoulder part, the outer flange bearing against the wall and the inner flange bearing against the annular side, a flexible packing member, and means clamping the flexible packing member upon the shoulder part.

4. An oil excluding ring comprising a cage embodying a substantially plane outer part and a circular wall merging therefrom, an ogee annulus having one flange with its outer periphery in engagement with the inner surface of the circular wall, a second flange radially spaced from said first flange having its edge in engagement with the plane annular side, said flanges being interconnected by a shoulder part approximately parallel with said annular side, a flexible packing member having an annular flange seated upon said shoulder part, and means for clamping said annular part on said shoulder part.

PATRICK J. FITZGERALD.